(12) United States Patent
Amonou et al.

(10) Patent No.: US 9,055,294 B2
(45) Date of Patent: Jun. 9, 2015

(54) METHOD AND DEVICE FOR ENCODING AN IMAGE USING A PREDICTION MASK DECODING METHOD AND DEVICE AND CORRESPONDING SIGNALS AND COMPUTER PROGRAMS

(75) Inventors: Isabelle Amonou, Cesson Sevigne (FR); Matthieu Moinard, Cesson Sevigne (FR); Nathalie Cammas, Sens de Bretagne (FR)

(73) Assignee: France Telecom, Paris (FR)

( * ) Notice: Subject to any disclaimer, the term of this patent is extended or adjusted under 35 U.S.C. 154(b) by 436 days.

(21) Appl. No.: 13/146,875

(22) PCT Filed: Jan. 26, 2010

(86) PCT No.: PCT/FR2010/050114
§ 371 (c)(1),
(2), (4) Date: Jul. 28, 2011

(87) PCT Pub. No.: WO2010/086544
PCT Pub. Date: Aug. 5, 2010

(65) Prior Publication Data
US 2011/0286521 A1 Nov. 24, 2011

(30) Foreign Application Priority Data
Jan. 28, 2009 (FR) ...................................... 09 50511

(51) Int. Cl.
*H04N 7/26* (2006.01)
*H04N 19/192* (2014.01)
(Continued)

(52) U.S. Cl.
CPC ........... *H04N 19/192* (2014.11); *H04N 19/176* (2014.11); *H04N 19/61* (2014.11); *H04N 19/593* (2014.11); *H04N 19/11* (2014.11); *H04N 19/14* (2014.11); *H04N 19/182* (2014.11)

(58) Field of Classification Search
CPC ........... H04N 7/12; H04N 11/02; H04N 7/26; H04N 7/26026; H04N 7/26031; H04N 19/00; H04N 19/00157; H04N 19/00042; H04N 19/00763; H04N 19/00781
USPC ........................................ 375/240.13, 240.12
See application file for complete search history.

(56) References Cited

U.S. PATENT DOCUMENTS

| 5,767,909 A | 6/1998 | Jung |
| 2006/0067399 A1 | 3/2006 | Zhang |

(Continued)

FOREIGN PATENT DOCUMENTS

| EP | 1956847 A1 | 8/2008 |
| EP | 1976298 A2 | 10/2008 |

OTHER PUBLICATIONS

French Search Report and Written Opinion dated Nov. 12, 2009 for corresponding French Application No. FR 0950511, filed Jan. 28, 2009.

(Continued)

*Primary Examiner* — Jay Patel
*Assistant Examiner* — Francis G Geroleo
(74) *Attorney, Agent, or Firm* — David D. Brush; Westman, Champlin & Koehler, P.A.

(57) ABSTRACT

A method is provided for encoding at least one image, divided into macroblocks, one macroblock including a set of blocks de pixels. The method includes, for at least one current macroblock of a current image, at least two iterations of the following steps: allocation of a priority level for encoding to at least one pixel of the current macroblock, selection of a pixel with the highest priority level called the priority pixel, prediction of a set of pixels including the priority pixel and a step of encoding a remainder from prediction for a region made up of predicted pixels of the macroblock, called the predicted region, the encoding step being used as and when the predicted region meets a predetermined encoding criterion.

13 Claims, 4 Drawing Sheets

(51) Int. Cl.
*H04N 19/176* (2014.01)
*H04N 19/61* (2014.01)
*H04N 19/593* (2014.01)
*H04N 19/11* (2014.01)
*H04N 19/14* (2014.01)
*H04N 19/182* (2014.01)

(56) References Cited

U.S. PATENT DOCUMENTS

2007/0041450 A1   2/2007   Kim et al.
2008/0310744 A1*  12/2008  Mim et al. .................. 382/238
2009/0003443 A1*  1/2009   Guo et al. ................ 375/240.13
2009/0116759 A1*  5/2009   Suzuki et al. .............. 382/238

OTHER PUBLICATIONS

Guo, Wang, Li, "Priority-based template matching intra prediction", pp. 1117-1120, 2008 IEEE.
International Search Report and Written Opinion dated Apr. 1, 2010 for corresponding International Application No. PCT/FR2010/050114, filed Jan. 26, 2010.
Sugimoto K. et al., "Inter Frame Coding with Template Matching Spatio-Temporal Prediction" Image Processing, 2004. ICIP '04. 2004 International Conference on Singapore Oct. 24-27, 2004, Piscataway, NJ, USA, IEEE LNKD—DOI: 10. 1109/ICIP. 2004. 1418791, vol. 1, Oct. 24, 2004, pp. 465-468, XP010784855. ISBN: 978-0-7803-8554-2, pp. 465-467, sections 1-2 p. 467, section 3.
Thiow Keng Tan et al., "Intra Prediction by Template Matching" Image Processing, 2006, IEEE International Conference on, IEEE, PI, Oct. 1, 2006, pp. 1693-1696, XP031048981 ISBN: 978-1-4244-0480-3.
Jiheng Yang et al., "A Block-Matching Based Intra Frame Prediction for H.264/AVC" IEEE International Conference on Multimedia and Expo, Jul. 1, 2006, pp. 705-708, XP031032933, ISBN: 978-1-4244-0366-0.
Yongjun Wu et al., "Directional Spatial I-Blocks for the MC-EZBC Video Coder" IEEE International Conference on Acoustics, Speech, and Signal Processing, vol. 3, May 17, 2004, pp. 129-132, XP010718143 ISBN: 978-0-7803-8484-2.
Taichiro Shiodera et al., "Block Based Extra/Inter-Polating Prediction for Intra Coding" IEEE International Conference on Image Processing, Sep. 1, 2007, pp. VI-445, XP031158358 ISBN: 978-1-4244-1436-9.

\* cited by examiner

METHOD AND DEVICE FOR ENCODING AN IMAGE USING A PREDICTION MASK DECODING METHOD AND DEVICE AND CORRESPONDING SIGNALS AND COMPUTER PROGRAMS

CROSS-REFERENCE TO RELATED APPLICATIONS

This Application is a Section 371 National Stage Application of International Application No. PCT/FR2010/050114, filed Jan. 26, 2010 and published as WO 2010/086544 A1 on Aug. 5, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the encoding and decoding of images, and especially of a video stream constituted by a series of successive images. More specifically the disclosure pertains to the compression of images or image sequences using block transforms.

The disclosure can be applied especially to video encoding implemented in present-day video encoders (MPEG, H.264 etc) or future video encoders (ITU-T/VC EG (H.265) or ISO/MEPG (HVC)).

BACKGROUND OF THE DISCLOSURE

There already exist many known video data compression techniques. These include numerous video encoding techniques that use a block-wise representation of the video sequence such as for example techniques implementing video compression standards laid down by the MPEG organization (MPEG-1, MPEG-2, MPEG-4 part 2, etc) or the ITU-T (H.261 ... H.264/AVC). Thus, in the H.264 technique, each image can be divided into slices which are themselves divided into macroblocks which are then sub-divided into blocks. A block is constituted by a set of pixels. According to the H.264 standard, a macroblock is a square block of a size equal to 16×16 pixels which can be re-divided into blocks sized 8×8, 16×8 or 8×16, the 8×8 blocks being then capable of being re-divided into sub-blocks sized 4×4, 8×4 or 4×8.

According to the prior-art techniques, the macroblocks or the blocks can be encoded by intra-image or inter-image prediction. In other words, a macroblock or block can be encoded by:
 a temporal prediction, i.e. with reference to a reference block or macroblock belonging to one or more other images; and/or
 a spatial prediction as a function of blocks or macroblocks of the current image.

In the case of a spatial prediction, a current block can be predicted only from blocks that have been previously encoded by means of a technique of directional extrapolation of the encoded-decoded values of texture on the neighboring blocks. These blocks are said to belong to the "causal neighborhood" of the current block, comprising the blocks situated before the current block in a predetermined direction of scanning of the blocks in the image.

Thus, to predict a macroblock or a block on the basis of its causal neighborhood, nine modes of intra-prediction are used according to the ITU-T H.264 standard. These modes of prediction comprise eight modes corresponding to a given orientation for copying the pixels on the basis of the previously encoded-decoded neighboring blocks (the vertical, horizontal, diagonal down left, diagonal down right, vertical right, vertical left, horizontal up and horizontal down orientations) and one mode corresponding to the average of the pixels adjacent to the block from the neighboring blocks.

Unfortunately, spatial prediction is insufficient on its own, whence the need to encode a prediction error. Thus, for each block, a residual block is encoded. This residual block is also called a prediction residue, corresponding to the original block minus a prediction. To this end, the coefficients of this block are quantified after a possible transform (for example a DCT or discrete cosine transform), and then encoded by an entropy encoder. At the encoder, the chosen mode of prediction is the one used to obtain the most appropriate compromise between bit rate and distortion.

Thus, in intra-encoding mode, the values of texture of the current block are predicted on the basis of the encoded-decoded values of texture of the neighboring blocks, and then a prediction residue gets added to this prediction.

In the case of a temporal prediction, the ITU-T H.264 standard uses a shift in the sense of motion to predict a block or a macroblock from its temporal neighborhood. The motion vector is then encoded and transmitted.

Alternative methods of intra-prediction have been proposed recently, based especially on correlations between neighboring pixels.

For example, the article from Tan et al, *Intra Prediction by Template Matching*, presents a texture synthesis technique of this kind based on a method of intra-prediction, also called "template matching". A simplified scheme of this technique is illustrated in FIG. 1.

This technique is used to synthesize a pixel p (or group of pixels) in a target zone C of the image, in taking account of a source zone S of the same image. It is based on the correlations between neighboring pixels. Thus, the value of each pixel p of the target zone C is determined by comparing (11) the pixels N(p) belonging to the causal neighborhood of the pixel p, defining a "template" or "mask" of the pixel p with all the neighbors of the source zone S. The mask N(p) therefore consists of pixels that are previously encoded/decoded, and this prevents the propagation of errors.

If a region of the source zone S similar to the template defined by N(p) is found, then the pixel (or group of pixels) of the source zone S having the most similar neighborhood is allocated (12) to the pixel p of the target zone C.

Classically, the region closest to the template in the source image, corresponding to a region similar to the template, is chosen by criteria of mean squared error minimization or absolute error minimization using the following formula:

$$N(q') = \arg\min_{N(q) \in S} d(N(p), N(q))$$

with:
 q being a pixel of the source zone S;
 d being a function measuring the distance between two masks according to the minimization criterion chosen.

In this technique, the pixels are synthesized in a fixed and predetermined order, generally from top to bottom and from left to right (i.e. in the raster scan order).

The classic technique of template matching is used to synthesize textures constituted by random structures.

However, it is not very efficient when it is applied to natural images formed by combined textures and contours.

The template matching technique has also been extended to the encoding of blocks of an H.264 encoder by Wang et al, as described in "*Priority-based template matching intra prediction*". A macroblock can thus be encoded/decoded using blocks (formed by 4×4 pixels according to the H.264 standard) rebuilt by the "template matching" technique.

As illustrated in FIG. 2, in the application by Wang et al, the blocks are classically processed in a raster scan order, i.e. a left to right and top to bottom order of scanning the blocks in the macroblock. Consequently, the macroblock is encoded/decoded (or rebuilt) block by block. The processing of the blocks one after the other enables the use the pixels of a previously encoded/decoded block as "source zone" for a current block, according to the scanning order.

Unfortunately, this technique is not optimal because it forces the rebuilding of the macroblock to be done on the basis of 4×4-pixel blocks.

There is therefore a need for new image encoding/decoding techniques implementing a "template matching" type of synthesis technique, enabling these prior-art techniques to be improved.

SUMMARY

An exemplary embodiment of the present invention proposes a novel solution that does not have all these drawbacks of the prior art, in the form of a method for encoding at least one image, divided into standard-sized zones known as macroblocks, one macroblock comprising a set of blocks of pixels.

According to an embodiment of the invention, such a method implements, for at least one current macroblock of a current image:

at least two iterations of the following steps:
  assigning a level of encoding priority to at least one pixel of the current macroblock, adjacent to at least one previously predicted pixel, according to a predetermined criterion for determining priority;
  selecting a pixel having the highest level of priority, called a priority pixel;
  predicting a set of pixels including the priority pixel, called a target set, implementing the following sub-steps:
    identifying a template corresponding to a predetermined model region, the template and target set forming a block;
    searching in the previously encoded blocks of the current image or of a reference image for a source block comprising a zone similar to the template;
    building the target set from the source block, delivering predicted pixels;
and a step (35) for encoding a prediction residue for a region formed by predicted pixels of said macroblock, called a predicted region, by determining a difference between the predicted pixels of said predicted region and original pixels belonging to the current image (not encoded).

According to an embodiment of the invention, the encoding step is implemented once the predicted region meets a predetermined encoding criterion.

An embodiment of the invention thus proposes to improve the existing "template matching" type techniques by working directly on a macroblock and by adapting the order of scanning the pixels of the macroblock for the prediction of the macroblock.

In this way, the quality of the prediction and hence the quality of the encoding and decoding of the images is optimized while, at the same time, the bit rate needed for the encoding is reduced.

It may be recalled that, according to those skilled in the art, the efficiency of a "template matching" type technique applied to an entire block is limited because the further the operation approaches the end of the macroblock, the greater will be the distance between the predicted pixels used for the prediction and the pixels to be predicted. Indeed, since the predicted pixels at the start of the macroblock have not yet been encoded/decoded (the prediction error has not yet been encoded), the predicted pixels do not give a sufficiently good prediction and there is a risk that errors will be propagated towards the end of the macroblock and that there will be a corresponding increase in the cost of encoding the residue.

It is thus possible to indicate only once that a template matching type of technique is being used for the entire block, without having to indicate it for each block.

Furthermore, while according to the classic "template matching" technique, the pixels are synthesized in a fixed and predetermined order, an embodiment of the invention proposes to adapt this scanning order to a level of priority assigned to the pixels and recompute this scanning order when a target set of pixels is predicted.

The sense of scanning of the pixels within a macroblock is therefore adaptive whereas, according to the prior-art techniques, this scanning order is predefined and unchangeable.

Finally, it can be noted that the prediction residue corresponding to the difference between the predicted pixels of the predicted region and the original pixels belonging to the current image can be almost zero. This means that the prediction is sufficient (for example for a specific application: low bit rate, low quality etc). In this case, the prediction residue obtained is low and may be cancelled when the residue is quantified.

For example, the encoding criterion belongs to the group comprising:
  a number of predicted pixels greater than a predetermined threshold;
  a predetermined configuration of the predicted pixels.

For example, a configuration of this kind is in accordance with the transforms used by the encoder and corresponds to a 4×4 block in the case of a H.264-AVC encoder. Such a configuration can also be processed by a transform implemented in the encoder/decoder and corresponds to a 2×8 block or an 8×2 block or 16×1 or 1×16 block or any 16-pixel region in the case of an SA-DCT (shape adaptive discrete cosine transform) type of transform.

Thus, as soon as pixels in sufficient number are predicted (or restored), it is possible to encode and decode the corresponding predicted region. The pixels thus encoded/decoded (or rebuilt) can then be used to predict the following regions of the macroblock. These encoded/decoded pixels are henceforth considered to belong to a "source" zone as defined with reference to the prior art.

For example, the predicted region comprises 16 predicted pixels.

In other words, as soon as 16 pixels are predicted (forming a region of 4×4 pixels, 2×8 pixels, 8×2 pixels, 16×1 pixels or again 1×16 pixels) the residue associated with this region is determined and this region is encoded/decoded.

According to one particular embodiment of the invention, the criterion for determining priority takes account of at least one parameter belonging to the group comprising:

a number of previously predicted or encoded pixels, called available pixels, adjacent to said at least one pixel;

the presence of a contour that is a continuation of a contour coming from a set of previously predicted or encoded pixels, where at least one pixel of said set is adjacent to said at least one pixel;

a number of previously predicted or encoded pixels belonging to said template;

a statistical parameter representing an activity of the neighborhood of said pixel;

a number of candidates similar to said template, defined for example by the sum of the different absolutes, as described with reference to the prior art.

Thus, the sense of scanning of the pixels within a macroblock takes account of parameters for optimizing the encoding in improving the efficiency of the prediction and hence the quality of the reconstruction of the pixels.

For example, one of the parameters taken into account to allocate a priority to a pixel corresponds to the number of available pixels already encoded-decoded (or rebuilt) that can be used to encode this pixel.

This parameter can have for example a value directly corresponding to the number of pixels available.

Another parameter takes account of the presence of an incident contour in a pixel, i.e. a contour that is also present in an adjacent already encoded-decoded pixel.

Thus, if a diagonal contour passes through a macroblock coming from an already encoded-decoded macroblock, the technique according to one embodiment of the invention adapts the scanning order to the sense of the contour and the diagonal scanning order obtained improves the quality of the prediction and thus the speed and quality of the decoding. This parameter which indicates the presence of an incident contour in a pixel (the pixel belonging to the contour), also denoted as a contour parameter, may have for example the value 1.

Yet another parameter takes account of the number of previously predicted or encoded pixels present in the template defined in the vicinity of the pixel. Thus, preference is given to the prediction of a target set for which the corresponding template comprises the largest number of already predicted pixels.

Then, the values of the parameters described here above may be added or multiplied to obtain a level of priority allocated to each pixel adjacent to a previously predicted pixel.

According to another aspect of an embodiment of the invention, at least one of the iterations is a refinement iteration during which the allocation step allocates a level of encoding priority to at least one pixel of the current macroblock adjacent to at least one previously encoded pixel.

Here, the encoded/decoded pixels and not solely the predicted pixels are taken into account. Indeed, it is possible to place greater reliance on the encoded/decoded pixels than on the solely predicted pixels. It may be recalled to this effect that if the predicted pixels do not give a sufficiently good prediction, they risk propagating errors towards the end of the macroblock and increasing the cost of encoding of the residue. Already encoded/decoded pixels are therefore used to refine the prediction.

An embodiment of the invention also pertains to a computer program comprising instructions to implement the encoding method described here above when the program is executed by a processor.

Thus, the encoding method according to an embodiment of the invention can be implemented in various ways, especially in wired form or in software form.

In another embodiment, the invention pertains to a device for encoding at least one image, divided into standard-sized zones known as macroblocks, one macroblock comprising a set of blocks of pixels.

According to an embodiment of the invention, such a device comprises the following means, activated for at least one current macroblock of a current image and for at least two iterations:

means for assigning a level of encoding priority to at least one pixel of the current macroblock, adjacent to at least one previously predicted pixel, according to a predetermined criterion for determining priority;

means for selecting a pixel having the highest level of priority, called a priority pixel;

means for predicting a set of pixels including the priority pixel, called a target set, comprising:

means for identifying a template corresponding to a predetermined model region, the template and the target set forming a block;

means for searching in the previously encoded blocks of the current image or of a reference image for a source block comprising a zone similar to the template;

means for building the target set from the source block, delivering predicted pixels;

and means for encoding a prediction residue for a region formed by predicted pixels of the macroblock, called a predicted region, by determining a difference between the predicted pixels of the predicted region and original pixels belonging to the current image (not encoded), the encoding means being activated once the predicted region complies with a predetermined encoding criterion.

An encoding device of this kind is especially adapted to implementing the encoding method described here above. It is for example an MPEG or H.264 type video encoder or an encoder according to a future video compression standard, for example H.265.

An embodiment of the invention also pertains to a signal representing at least one image encoded according to the encoding method described here above.

Such a signal comprises at least one piece of information representing the encoding criteria, such as a threshold corresponding to the minimum number of pixels that must be predicted to rebuild a predicted region.

This signal could of course include the different characteristics of the encoding method of an embodiment of the invention.

An embodiment of the invention also pertains to a method for decoding a signal representing at least one image, divided into standard-sized zones called macroblocks, one macroblock comprising a set of blocks of pixels.

According to an embodiment of the invention, such a method implements at least two iterations of the following steps for at least one current macroblock of a current image:

assigning a priority level of encoding to at least one pixel of the current macroblock, adjacent to at least one previously predicted pixel, according to a predetermined criterion for determining priority;

selecting a pixel having the highest level of priority, called a priority pixel;

predicting a set of pixels including the priority pixel, called a target set, implementing the following sub-steps:

identifying a template corresponding to a predetermined model region, the template and the target set forming a block;

searching in the previously encoded blocks of the current image or of a reference image for a source block comprising a zone similar to the template;

building the target set from the source block, delivering predicted pixels;

and the method also comprises:

a step for receiving at least one prediction residue;

a step for rebuilding a region formed by predicted pixels of the macroblock, called a predicted region, by adding a prediction residue corresponding to the predicted region, the rebuilding step being implemented once the predicted region complies with a predetermined encoding criterion.

The characteristics and advantages of this decoding method are the same as that of the encoding method. They are therefore not described in greater detail.

A decoding method of this kind is capable of decoding a signal as described earlier.

Thus, according to a particular characteristic, such a method comprises a step for receiving at least one piece of information representing the encoding criterion.

An embodiment of the invention also pertains to a computer program comprising instructions to implement the decoding method described here above when the program is executed by a processor.

Thus, the decoding method can be implemented in various ways, especially in wired form or in software form.

In another embodiment, the invention pertains to a device for decoding a signal representing at least one image, divided into standard-sized zones called macroblocks, one macroblock comprising a set of blocks of pixels.

According to an embodiment of the invention, the device comprises the following means, activated for at least one current macroblock of a current image and at least two iterations:

means for assigning a priority level of encoding to at least one pixel of the current macroblock, adjacent to at least one previously predicted pixel, according to a predetermined criterion for determining priority;

means for selecting a pixel having the highest level of priority, called a priority pixel;

means for predicting a set of pixels including the priority pixel, called a target set, comprising:

means for identifying a template corresponding to a predetermined model region, the template and the target set forming a block;

means for searching in the previously encoded blocks of said current image or of a reference image for a source block comprising a zone similar to said template;

means for building the target set from the source block, delivering predicted pixels;

as well as:

means for receiving at least one prediction residue;

means for rebuilding a region formed by predicted pixels of the macroblock, called a predicted region, by adding a prediction residue corresponding to the predicted region, activated once the predicted region complies with a predetermined encoding criterion.

A decoding device of this kind is especially adapted to implementing the encoding method described here above. It is for example an MPEG or H.264 type video encoder or an encoder according to a future video compression standard, for example H.265

BRIEF DESCRIPTION OF THE DRAWINGS

Other features and advantages shall appear more clearly from the following description of a particular embodiment, given by way of a simple, illustrative and non-exhaustive example and from the appended drawings, of which FIG. 1, commented upon with reference to the prior art, is a simplified scheme of the technique known as "template matching".

DETAILED DESCRIPTION OF ILLUSTRATIVE EMBODIMENTS

1. General Principle

The general principle of an embodiment of the invention relies on the adaptive encoding/decoding of a macroblock enabling the prediction of the pixels and then the encoding/decoding of the regions of predicted pixels, once there is a sufficient number of predicted pixels available for the transformation and encoding of the residue.

Thus, the encoding/decoding of the macroblock does not require the encoding/decoding of the different blocks of the macroblocks one after the other in a predefined scanning order.

Figure 1:
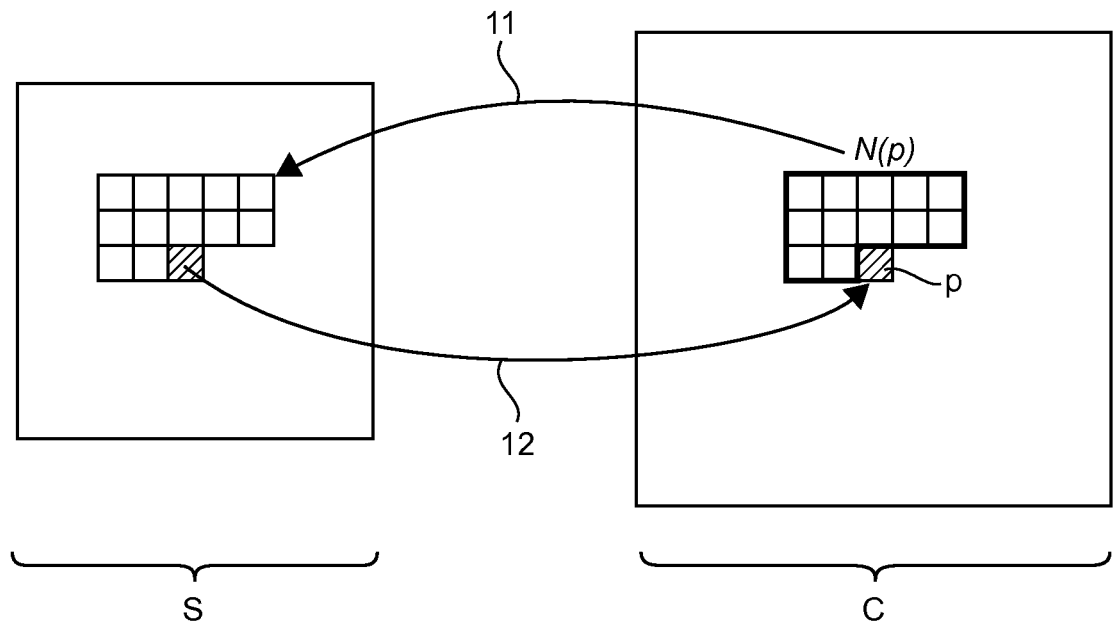
Figure 2:
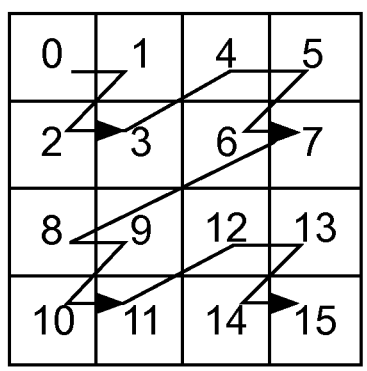
FIG. 2 illustrates an example of a sense of scanning for the encoding of the blocks of a macroblock.
Figure 3:
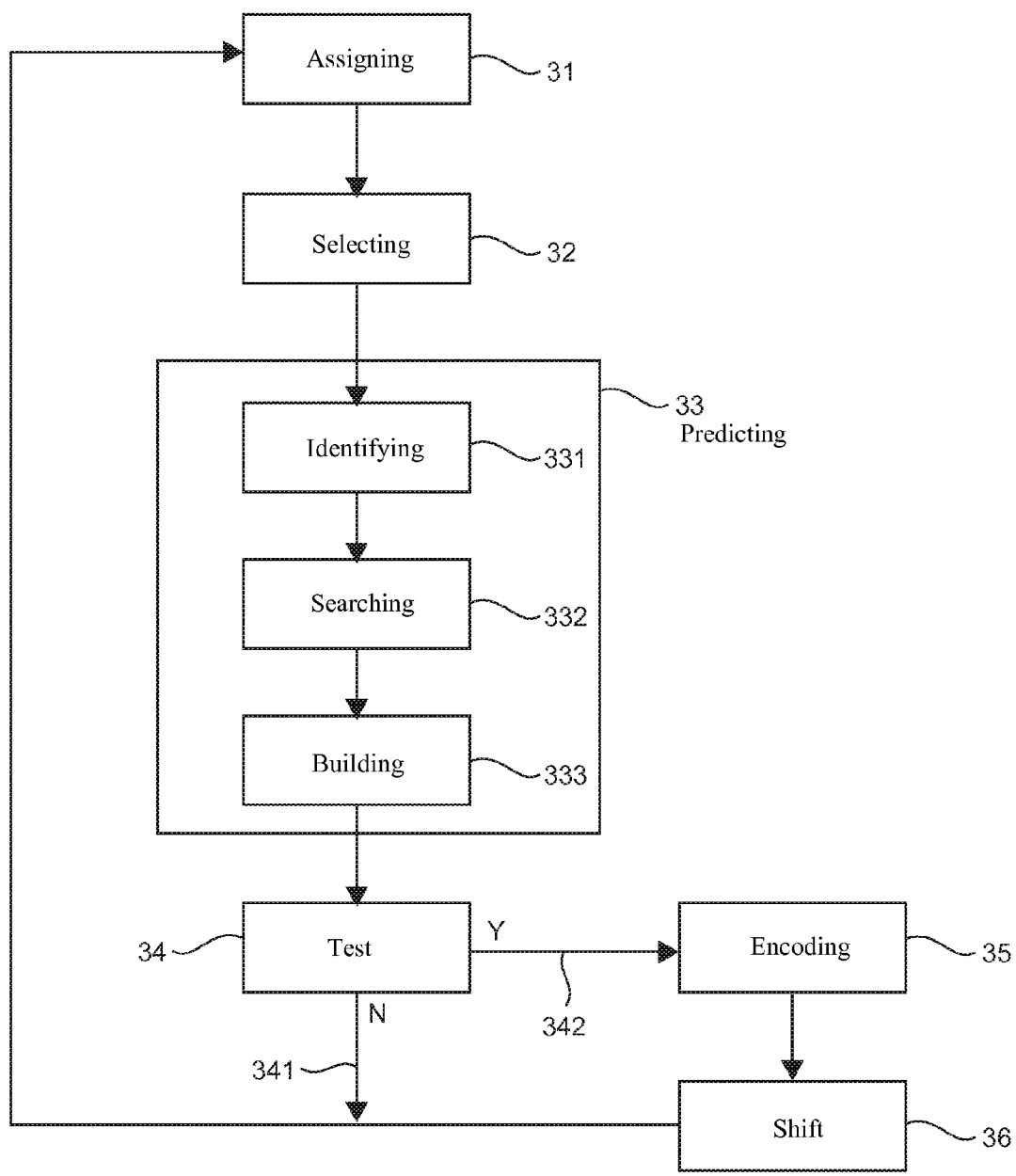
FIG. 3 presents the main steps implemented for encoding according to a particular embodiment of the invention.

FIG. 3 illustrates the main steps implemented on the encoding side for at least one current macroblock of a current image.

The term "prediction boundary" denotes the line separating the already predicted pixels from the as yet non-predicted pixels, and the term "encoding boundary" denotes a line separating the already encoded/decoded pixels from the pixels that are as yet not encoded/decoded.

Thus, the encoding method implements at least two iterations of the following steps:

assigning 31 a level of encoding priority to at least one pixel of the current macroblock, adjacent to at least one previously predicted pixel, according to a predetermined criterion of priority determination. In other words, a level of priority is allocated to the as yet non-predicted pixels localized at the prediction boundary. During the first iteration of encoding of a macroblock, the prediction and encoding boundaries are superimposed;

selecting 32 a pixel having the highest priority level, called a priority pixel p, from among the pixels localized at the prediction boundary;

predicting 33 a set of pixels including the priority pixel, called a target set P, implementing the following substeps:

identifying 331 a template Tp corresponding to a predetermined model region, the template Tp and the target set P forming a block;

searching 332 in the previously encoded blocks of the current image or of a reference image for a source block comprising a zone similar to the template Tp;

building 333 the target set P from the source block, delivering predicted pixels.

The prediction boundary is therefore shifted to include the new predicted pixels.

Then a test is made (34) to see if a region formed by predicted pixels of the macroblock, called a predicted region, complies with a predetermined encoding criterion.

If this is not the case (341), then the previous steps are reiterated by returning to the steps 31 for assigning a level of encoding priority.

If the predicted region complies (342) with the predetermined encoding criterion, then the encoding method implements a step 35 for encoding a prediction residue for the predicted region of the macroblock, by determining a difference between the predicted pixels of the predicted region and the original pixels belonging to the current image. It may be recalled that the prediction residue can be almost zero. In this case, the prediction residue obtained is cancelled during the quantification step.

At the end of the encoding step, the predicted region is deemed to be encoded/decoded. Consequently, the encoding boundary is shifted (at step 36) in order to include the new encoded/decoded pixels. These new encoded/decoded pixels are henceforth considered to be pixels belonging to the source zone of the image that can be used for predicting non-predicted pixels or for refining the prediction of already predicted pixels.

2. Description of a Particular Embodiment for Implementing the Encoding

Henceforth, referring to FIGS. 4A to 4G, an illustration of the application of a particular embodiment of the encoding method to the case of intra-prediction in an H.264 encoder for example, using 16×16-sized macroblocks divided into 4×4-sized blocks is provided. This is of course only an example. An embodiment of the invention can be applied to an image encoder using regions of arbitrary sizes and shapes, in the context of intra-image or inter-image prediction.

In this example of an application, the current macroblock MB is formed by 16 blocks each comprising 4×4 pixels. This macroblock MB is adjacent in the image to three already encoded/decoded macroblocks (localized above the current macroblock—$MB_T$, left of the current macroblock—$MB_L$, and top left of the current macroblock—$MB_{TL}$). The term "adjacent" is understood here to denote a macroblock that touches the boundary of the current macroblock.

In this embodiment, it is sought to restore the current macroblock MB optimally in complying with an order of priority for the encoding/decoding (or rebuilding) of information.

The previously encoded/decoded macroblocks $MB_T$, $MB_L$ and $MB_{TL}$ (represented by hatched lines diagonal in both directions) are deemed to belong to a source zone of the image which can be used for the prediction of as yet non-predicted regions.

FIGS. 4B to 4G each illustrate the result obtained after an iteration of prediction as described with reference to FIG. 3 for the encoding of the current macroblock MB.

Figure 4A:
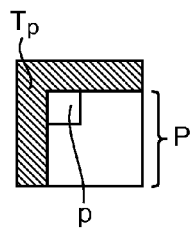
FIGS. 4A to 4G illustrate the application of the encoding method of FIG. 3 to a macroblock.
Figure 4B:
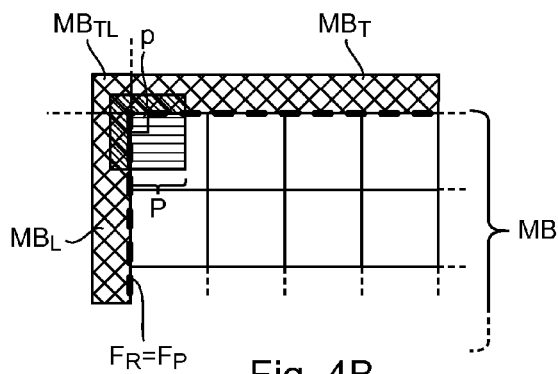

As illustrated in FIG. 4B, the previously encoded/decoded macroblocks $MB_T$, $MB_L$ and $MB_{TL}$ define, along with the current macroblock MB, an encoding boundary $F_R$. This encoding boundary $F_R$ (represented in the other FIGS. 4C to 4G by short dashes) is superimposed on a prediction boundary $F_P$ (represented by long dashes) during the first iteration.

During a first iteration according to the algorithm described in FIG. 3, an encoding priority level is assigned to the non-predicted pixels of the macroblock MB localized at the prediction boundary $F_P$. For example, a priority level is assigned to all the pixels of the macroblock MB adjacent to a previously predicted pixel of the previously encoded/decoded macroblocks $MB_T$, $MB_L$ and $MB_{TL}$.

For example, the pixel p, situated in the left-hand top corner of the macroblock MB, is considered to have the highest priority level. Indeed, this pixel is adjacent to five previously encoded/decoded (and therefore predicted) pixels. This pixel is called a "priority pixel". It is then sought to predict a target set P, represented by horizontal hatched lines in FIG. 4B, comprising the priority pixel p. This target set corresponds for example to the first three rows and first three columns of the first block of the macroblock MB.

To this end, a template Tp is identified such that the template Tp and the target set P form a block (see FIG. 4A for greater clarity).

A search is then made in the previously encoded blocks of the current image (in the case of an intra-prediction) or of a reference image (in the case of an inter-prediction) for a source block comprising a zone Tn similar to the template Tp. This search region comprising a set of previously encoded/decoded (or rebuilt) blocks, also called a source zone, is demarcated by the encoding boundary. In other words, a search is made in the source zone for a "mask" Tn (or template) that is closest to the template Tp and then the target set P is built from the source block thus identified. To this end, it is possible to copy out the identified pixels of the source block that do not belong to the similar zone into the target set P. This "template matching" technique is described more precisely with reference to the prior art.

In this way, a prediction of the target set P, delivering predicted pixels, is obtained.

Since the number of predicted pixels is not sufficient to encode/decode a region of the macroblock MB, the previous steps are recommenced during a second iteration.

Figure 4C:
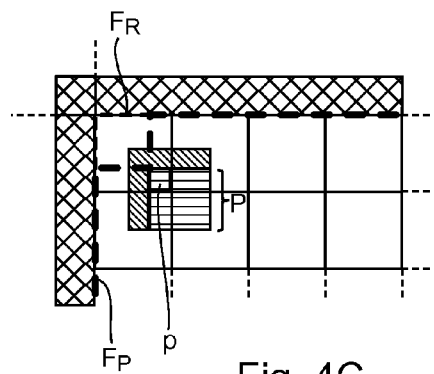

As illustrated in FIG. 4C, it can be seen that the prediction boundary $F_P$ has shifted to include the new predicted pixels. By contrast, the encoding boundary $F_R$ has not changed.

More specifically, during a second iteration, a new level of encoding priority is assigned to the non-predicted pixels of the macroblock MB adjacent to a previously predicted pixel. These non-predicted pixels correspond to the pixels localized at the prediction boundary $F_P$.

For example, the pixel p, corresponding to the pixel localized on the fourth line, fourth column of the macroblock MB, is considered to have the highest priority level. For example, this priority pixel p is localized on a contour that passes through the target set defined at the first iteration.

It is sought to predict a new target set P represented by horizontal hatched lines in FIG. 4C, comprising the priority pixel p. To this end, a new template Tp is identified such that the template Tp and the target set P form a block.

It can be noted that the shape of the target set P and of the template Tp (i.e. the number of pixels and the configuration of the pixels) does not progress during the different iterations. By contrast, the pixels present in the target set P and in the template Tp differ from one iteration to the other.

A search is then made in the source zone for a source block comprising a zone Tn similar to the template Tp. This search region is the same as for the first iteration since the encoding boundary $F_R$ has not progressed.

Thus, a prediction of the target set P is obtained, delivering predicted pixels.

Figure 4D:
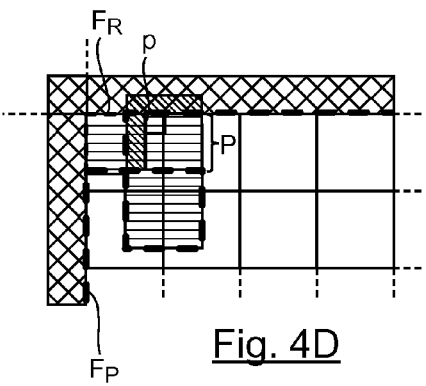
Figure 4E:
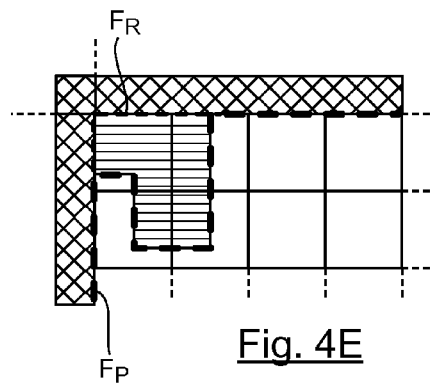
Figure 4F:
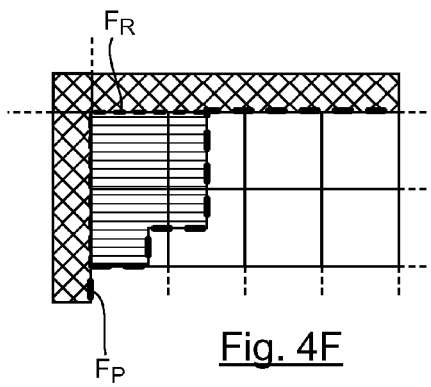

Since the number of predicted pixels is not sufficient to encode/decode a region of the macroblock MB, the preceding steps are recommenced during a third iteration (the result of which is illustrated in FIG. 4D), and then a fourth iteration (the result of which is illustrated in FIG. 4E), and then a $K^{th}$ iteration (the result of which is illustrated in FIG. 4F).

At the end of the third and fourth iterations, the number of predicted pixels is not sufficient to encode/decode a region of the macroblock MB. Consequently, the encoding boundary $F_R$ has not progressed. By contrast, the prediction boundary $F_P$ has shifted to include the new predicted pixels.

At the end of the $K^{th}$ iteration, the number of pixels predicted is deemed to be sufficient to encode/decode (or rebuild) a predicted region of the macroblock MB, in encoding a prediction residue associated with this region. For example, a number of pixels has been predicted and this number is sufficient for these predicted pixels to be capable of being used for a transformation and an encoding of the residue. For example, the first block B1 (localized at the top-left corner of the macroblock MB) is totally predicted.

Naturally, this step for encoding the residue can be implemented to encode/decode (or rebuild) a predicted region of a different size, such as a region formed by 2×2 predicted pixels, 4×4 predicted pixels, 8×8 predicted pixels, 2×8 predicted pixels, 8×2 predicted pixels, 16×1 predicted pixels, 1×16 predicted pixels etc. It is thus possible to rebuild a data block as soon as 16 pixels have been predicted (for example 16 pixels of the same row or the same column etc).

In other words, this step for encoding the residue is implemented as soon as the predicted region complies with a predetermined encoding criterion, for example having a number of predicted pixels greater than a predetermined threshold, or having a specific configuration of the predicted pixels.

At the end of this encoding step, the first block B1 of the macroblock MB is rebuilt (i.e. encoded and decoded with its residue). Consequently, the encoding boundary $F_R$ is shifted to include this new encoded/decoded block B1, which is henceforth a part of the source zone of the image, and can serve as a reliable source for the prediction of the remaining regions to be restored of the macroblock MB. It may be recalled that, on the other hand, it is not possible to use predicted but non-rebuilt pixels for the prediction.

Figure 4G:
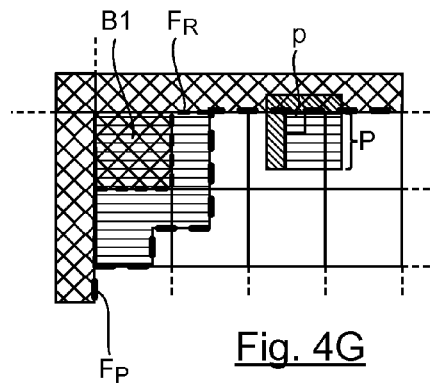

During an iteration k+1, the result of which is illustrated in FIG. 4G, it is therefore possible to predict the target set P by using the block B1.

Furthermore, it is also possible to refine the prediction of certain pixels when a region has been encoded/decoded.

For example, as illustrated in FIG. 4G, it is possible to refine the prediction of the predicted region localized between the prediction boundary $F_P$ and encoding boundary $F_R$ in taking account of the new source zone.

Thus, this embodiment proposes to encode/decode (or rebuild) a region of the macroblock as soon as pixels in sufficient number have been predicted and can be used for a transformation and encoding of the residue. These pixels are then encoded (predicted pixels to which a prediction residue is added) and can serve in turn for prediction.

Thus, the invention proposes several advantages resulting from the implementation of at least one embodiment:
the algorithm can progress freely in the macroblock in restoring/predicting image regions straddling several blocks;
the rebuilding of the blocks (sized 4×4 according to the H.264 standard) is not imposed according to a predetermined order.

It can also be noted that the proposed solution can be integrated without any difficulty into an H.264 type macroblock-based video encoder, without entailing any in-depth modification of its operation. To this end, it is enough to add a new mode of spatial prediction of the macroblocks or replace several existing modes that are little used in the context of an embodiment of the present invention. In particular, the bit-rate/distortion optimizing process remains unchanged.

3. Signal

Once the image or the images have been encoded, the signal representing the images encoded according to the above-described encoding method can be transmitted to a decoder and/or stored on a recording medium.

This signal can convey particular items of information.

For example, this signal can convey at least one piece of information representing the encoding criterion such as a threshold corresponding to the minimum number of pixels that must be predicted to rebuild a predicted region.

This signal can also transmit a piece of information representing the criterion for determining priority. Indeed, the priority of the pixels to be predicted, localized at the prediction boundary, can be computed in the encoder and transmitted to the decoder or alternatively recomputed at the decoder.

This signal can also convey the prediction residue or residues obtained by comparing the current image with the predicted image.

4. Decoding

Figure 5:
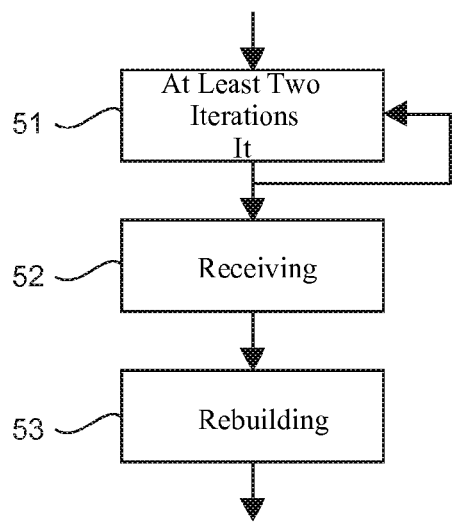
FIG. 5 shows the main steps implemented for decoding according to a particular embodiment of the invention.

Referring now to FIG. 5, we present the main steps for decoding a signal representing at least one encoded image as described here above, implemented in an H.264 type video decoder for example.

Such a decoder implements the following steps for at least one current image:
least two iterations It 51 of the following steps for at least one current macroblock of a current image:
assigning a priority level of encoding to at least one pixel of the current macroblock, adjacent to at least one previously predicted pixel, according to a predetermined criterion for determining priority;
selecting a pixel having the highest level of priority, called a priority pixel;
predicting a set of pixels comprising said priority pixel, called a target set;
a step 52 for receiving at least one prediction residue;
a step 53 for rebuilding a region formed by predicted pixels of the macroblock, called a predicted region, by the addition of a prediction residue corresponding to the predicted region, the rebuilding step being implemented as soon as said predicted region complies with a predetermined encoding criterion.

At least one piece of information representing this encoding criterion can be conveyed by the signal. In this case, the decoding method comprises an additional step for receiving information representing this encoding criterion. Similarly, the decoding method can implement an additional step for receiving a piece of information representing the criterion for determining priority.

The iterations 51 are similar to those described at the encoding level and are no longer described in detail herein.

In a simplified way, the decoding algorithm repeats the following steps until the macroblock is entirely rebuilt:
determining a priority level for the pixels adjacent to already predicted pixels (localized at the prediction boundary);
predicting a target set associated with the highest priority pixel, by using a template matching technique;
as soon as a sufficient number of new pixels have been restored, adding a prediction residue associated with a region thus predicted, enabling the rebuilding of this region. The pixels of the rebuilt region then become source pixels (belonging to a source zone) which can be used to predict the following regions of the macroblock.

5. Structures of the Encoder and of the Decoder

Figure 6:
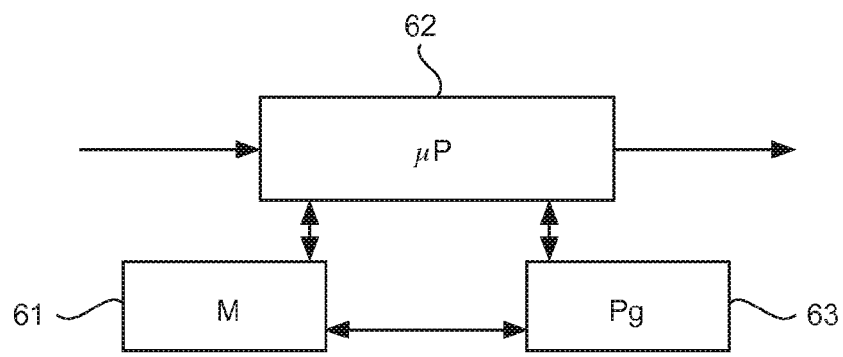
FIGS. 6 and 7 respectively present the structure of an encoding device and of a decoding device according to one particular embodiment of the invention.
Figure 7:
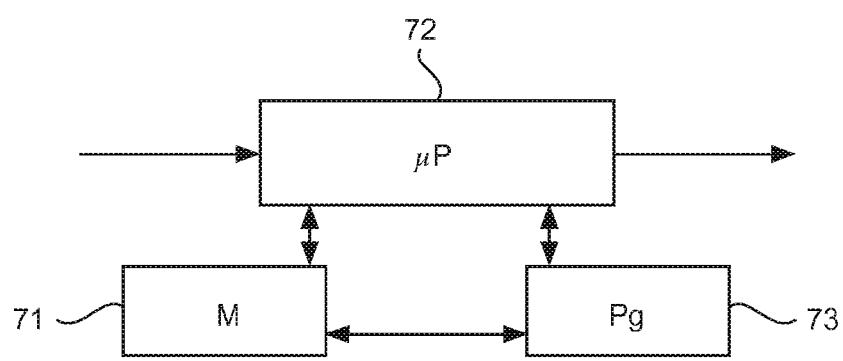

Finally, referring to FIGS. 6 and 7, the simplified structures are presented of an encoding and a decoding device respectively implementing an encoding technique and a decoding technique as described here above.

An encoding device, as illustrated in FIG. 6, comprises a memory 61 comprising a buffer memory, a processing unit 62 equipped for example with a microprocessor µP and driven by the computer program 63, implementing the encoding method according to an embodiment of the invention.

At initialization, the code instructions of the computer program 63 are for example loaded into a RAM and then executed by the processor of the processing unit 62. The processing unit 62 receives a current image to be encoded. The microprocessor of the processing unit 62 implements the steps of the encoding method described here above according to the computer program instructions 63 to encode the current image. To this end, the encoder comprises, in addition to the buffer memory 61, means for assigning a level of encoding priority to at least one pixel of a current macroblock, means for selecting a pixel having the highest level of priority, means for predicting a set of pixels including the priority pixel and means for encoding a prediction residue for a region formed by predicted pixels of the macroblock.

These means are driven by the microprocessor of the processing unit 62.

A decoding device, as illustrated in FIG. 7, comprises a memory 71 comprising a buffer memory, a processing unit 72 equipped for example with a microprocessor µP and driven by the computer program 73 implementing the decoding method according an embodiment of the invention.

At initialization, the code instructions of the computer program 73 are for example loaded into a RAM and then executed by the processor of the processing unit 72. The processing unit 72 inputs a signal representing at least one encoded image. The microprocessor of the processing unit 72 implements the steps of the decoding method described here above according to the instructions of the computer program 73 to determine the rebuilding of the current image. To this end, the decoding device comprises, in addition to the buffer memory 71, means for assigning a priority level of encoding to at least one pixel of a current macroblock, means for selecting a pixel having the highest level of priority, means for predicting a set of pixels including the priority pixel, means for receiving at least one prediction residue and means for rebuilding a region formed by predicted pixels of the macroblock.

These means are driven by the microprocessor of the processing unit 72.

Although the present disclosure has been described with reference to one or more examples, workers skilled in the art will recognize that changes may be made in form and detail without departing from the scope of the disclosure and/or the appended claims.

The invention claimed is:

1. A method comprising encoding with an encoding device at least one image, divided into macroblocks, one macroblock comprising a set of blocks of pixels,
    wherein encoding implements, for at least one current macroblock of a current image:
    at least two iterations of the following steps:
        assigning a level of encoding priority to at least one pixel of said current macroblock, adjacent to at least one previously predicted pixel, according to a predetermined criterion for determining priority;
        selecting a pixel having the highest level of priority, called a priority pixel; and
        predicting a set of pixels including said priority pixel, called a target set, implementing the following sub-steps:
            identifying a template corresponding to a predetermined model region, adjacent to said target set, said template and said target set forming a block;
            searching in the previously encoded blocks of said current image or of a reference image for a source block comprising a zone similar to said template, wherein similarity of said similar zone is evaluated according to a criterion of minimization of error between said template and said similar zone; and
            building said target set from said source block, delivering predicted pixels; and
    a step of encoding a prediction residue for a region formed by predicted pixels of the current macroblock, called a predicted region, by determining a difference between said predicted pixels of said predicted region and corresponding original pixels belonging to said current image, said encoding step being implemented once said predicted region meets a predetermined encoding criterion, before the totality of the pixels of said current macroblock is predicted such that a prediction boundary and an encoding boundary can vary from one another, said predetermined encoding criterion being based on a predetermined configuration in which the predicted pixels form a same row of pixels and/or a same column of pixels of said current macroblock.

2. A method comprising encoding with an encoding device at least one image, divided into macroblocks, one macroblock comprising a set of blocks of pixels,
    wherein encoding implements, for at least one current macroblock of a current image:
    at least two iterations of the following steps:
        assigning a level of encoding priority to at least one pixel of said current macroblock, adjacent to at least one previously predicted pixel, according to a predetermined criterion for determining priority;
        selecting a pixel having the highest level of priority, called a priority pixel; and
        predicting a set of pixels including said priority pixel, called a target set, implementing the following sub-steps:
            identifying a template corresponding to a predetermined model region, adjacent to said target set, said template and said target set forming a block;
            searching in the previously encoded blocks of said current image or of a reference image for a source block comprising a zone similar to said template, wherein similarity of said similar zone is evaluated according to a criterion of minimization of error between said template and said similar zone; and
            building said target set from said source block, delivering predicted pixels; and
    a step of encoding a prediction residue for a region formed by predicted pixels of the current macroblock, called a predicted region, by determining a difference between said predicted pixels of said predicted region and corresponding original pixels belonging to said current image, said encoding step being implemented once said predicted region meets a predetermined encoding criterion, before the totality of the pixels of said current macroblock is predicted such that a prediction boundary and an encoding boundary can vary from one another, said predetermined encoding criterion being based on a number of predicted pixels greater than a predetermined threshold and/or on a predetermined configuration in which the predicted pixels form a same row of pixels and/or a same column of pixels of said current macroblock, said criterion for determining priority taking account of a presence of a contour that is a continuation of a contour coming from a set of previously predicted or encoded pixels, where at least one pixel of said set is adjacent to said at least one pixel.

3. The method according to claim 2, wherein said predicted region comprises sixteen predicted pixels.

4. The method according to claim 2, wherein said criterion for determining priority takes account of at least one parameter belonging to the group consisting of:
- a number of previously predicted or encoded pixels adjacent to said at least one pixel;
- a number of previously predicted or encoded pixels belonging to said template;
- a statistical parameter representing an activity of a neighborhood of said pixel;
- a number of candidates similar to said template.

5. The method according to claim 2, wherein at least one of said iterations is a refinement iteration during which said assigning step allocates a level of encoding priority to at least one pixel of said current macroblock adjacent to at least one previously encoded pixel.

6. The method according to claim 2, comprising:
generating a signal representing at least the current image encoded according to the encoding steps recited in claim 2 and comprising at least one piece of information representing the encoding criteria; and
transmitting the signal.

7. A non-transitory memory readable by a computer and comprising a program stored thereon, which includes instructions to implement a method of encoding at least one image, divided into macroblocks, one macroblock comprising a set of blocks of pixels, when said program is executed by a processor, wherein the method comprises, for at least one current macroblock of a current image:

at least two iterations of the following steps:
assigning a level of encoding priority to at least one pixel of said current macroblock, adjacent to at least one previously predicted pixel, according to a predetermined criterion for determining priority;
selecting a pixel having the highest level of priority, called a priority pixel; and
predicting a set of pixels including said priority pixel, called a target set, implementing the following substeps:
identifying a template corresponding to a predetermined model region, adjacent to said target set, said template and said target set forming a block;
searching in the previously encoded blocks of said current image or of a reference image for a source block comprising a zone similar to said template, wherein similarity of said similar zone is evaluated according to a criterion of minimization of error between said template and said similar zone; and
building said target set from said source block, delivering predicted pixels; and
a step of encoding a prediction residue for a region formed by predicted pixels of the current macroblock, called a predicted region, by determining a difference between said predicted pixels of said predicted region and corresponding original pixels belonging to said current image, said encoding step being implemented once said predicted region meets a predetermined encoding criterion, before the totality of the pixels of said current macroblock is predicted such that a prediction boundary and an encoding boundary can vary from one another, said predetermined encoding criterion being based on a number of predicted pixels equal to a predetermined threshold, said threshold being strictly lower from a number of pixels comprised in one block of said set of blocks of pixels, and/or on a predetermined configuration in which the predicted pixels form a same row of pixels and/or a same column of pixels of said current macroblock, said criterion for determining priority taking account of a presence of a contour that is a continuation of a contour coming from a set of previously predicted or encoded pixels, where at least one pixel of said set is adjacent to said at least one pixel.

8. A device for encoding at least one image, divided into macroblocks, one macroblock comprising a set of blocks of pixels, wherein said device comprises the following means, activated for at least one current macroblock of a current image and for at least two iterations:

means for assigning a level of encoding priority to at least one pixel of said current macroblock, adjacent to at least one previously predicted pixel, according to a predetermined criterion for determining priority;
means for selecting a pixel having the highest level of priority, called a priority pixel;
means for predicting a set of pixels including the priority pixel, called a target set, comprising:
means for identifying a template corresponding to a predetermined model region adjacent to said target set, said template and target set forming a block;
means for searching in the previously encoded blocks of said current image or of a reference image for a source block comprising a zone similar to said template, wherein similarity of said similar zone is evaluated according to a criterion of minimization of error between said template and said similar zone; and
means for building said target set from the source block, delivering predicted pixels; and
means for encoding a prediction residue for a region formed by predicted pixels of said current macroblock, called a predicted region, by determining a difference between the predicted pixels of said predicted region and corresponding original pixels, said original pixels belonging to said current image, said encoding means being activated once said predicted region complies with a predetermined encoding criterion before all the pixels of said current macroblock have been predicted such that a prediction boundary and an encoding boundary can vary from one another, said predetermined encoding criterion being based on a number of predicted pixels equal to a predetermined threshold, said threshold being strictly lower from a number of pixels comprised in one block of said set of blocks of pixels, and/or on a predetermined configuration in which the predicted pixels form a same row of pixels and/or a same column of pixels of said current macroblock, said criterion for determining priority taking account of a presence of a contour that is a continuation of a contour coming from a set of previously predicted or encoded pixels, where at least one pixel of said set is adjacent to said at least one pixel.

9. A method comprising:
  decoding with a decoding device a signal representing at least one image, divided into standard-sized zones macroblocks, one macroblock comprising a set of blocks of pixels, wherein decoding comprises:
    implementing at least two iterations of the following steps, for at least one current macroblock of a current image:
      assigning a priority level of encoding to at least one pixel of said current macroblock, adjacent to at least one previously predicted pixel, according to a predetermined criterion for determining priority;
      selecting a pixel having the highest level of priority, called a priority pixel;
      predicting a set of pixels including the priority pixel, called a target set, implementing the following sub-steps:
        identifying a template corresponding to a predetermined model region adjacent to said target set, said template and said target set forming a block;
        searching in the previously encoded blocks of said current image or of a reference image for a source block comprising a zone similar to said template, wherein similarity of said similar zone is evaluated according to a criterion of minimization of error between said template and said similar zone; and
        building said target set from said source block, delivering predicted pixels; and
    a step of receiving at least one prediction residue; and
    a step of rebuilding a region formed by predicted pixels of said current macroblock, called a predicted region, by adding a prediction residue corresponding to said predicted region, said rebuilding step being implemented once said predicted region complies with a predetermined encoding criterion before all the pixels of said current macroblock have been predicted such that a prediction boundary and an encoding boundary can vary from one another, said predetermined encoding criterion being based on a number of predicted pixels equal to a predetermined threshold, said threshold being strictly lower from a number of pixels comprised in one block of said set of blocks of pixels, and/or on a predetermined configuration in which the predicted pixels form a same row of pixels and/or a same column of pixels of said current macroblock,
    said criterion for determining priority taking account of a presence of a contour that is a continuation of a contour coming from a set of previously predicted or encoded pixels, where at least one pixel of said set is adjacent to said at least one pixel.

10. The method according to claim 9, wherein the method comprises a step of receiving at least one piece of information representing said encoding criterion.

11. A computer program stored in a non-transitory computer readable medium and readable by a computer and comprising instructions which configure the computer to implement a method of decoding a signal representing at least one image, divided into standard-sized zones macroblocks, one macroblock comprising a set of blocks of pixels, when said program is executed by a processor, wherein the method comprises:
  implementing at least two iterations of the following steps, for at least one current macroblock of a current image:
    assigning a priority level of encoding to at least one pixel of said current macroblock, adjacent to at least one previously predicted pixel, according to a predetermined criterion for determining priority;
    selecting a pixel having the highest level of priority, called a priority pixel;
    predicting a set of pixels including the priority pixel, called a target set, implementing the following sub-steps:
      identifying a template corresponding to a predetermined model region adjacent to said target set, said template and said target set forming a block;
      searching in the previously encoded blocks of said current image or of a reference image for a source block comprising a zone similar to said template, wherein similarity of said similar zone is evaluated according to a criterion of minimization of error between said template and said similar zone; and
      building said target set from said source block, delivering predicted pixels; and
  a step of receiving at least one prediction residue; and
  a step of rebuilding a region formed by predicted pixels of said current macroblock, called a predicted region, by adding a prediction residue corresponding to said predicted region, said rebuilding step being implemented once said predicted region complies with a predetermined encoding criterion before all the pixels of said current macroblock have been predicted such that a prediction boundary and an encoding boundary can vary from one another, said predetermined encoding criterion being based on a number of predicted pixels equal to a predetermined threshold, said threshold being strictly lower from a number of pixels comprised in one block of said set of blocks of pixels, and/or on a predetermined configuration in which the predicted pixels form a same row of pixels and/or a same column of pixels of said current macroblock,
  said criterion for determining priority taking account of a presence of a contour that is a continuation of a contour coming from a set of previously predicted or encoded pixels, where at least one pixel of said set is adjacent to said at least one pixel.

12. A device for decoding a signal representing at least one image, divided into macroblocks, one macroblock comprising a set of blocks of pixels, wherein said device comprises the following means, activated for at least one current macroblock of a current image and for at least two iterations:
  means for assigning a priority level of encoding to at least one pixel of the current macroblock, adjacent to at least one previously predicted pixel, according to a predetermined criterion for determining priority;
  means for selecting a pixel having the highest level of priority, called a priority pixel;
  means for predicting a set of pixels including said priority pixel, called a target set, comprising:
    means for identifying a template corresponding to a predetermined model region adjacent to said target set, said template and said target set forming a block;
    means for searching in the previously encoded blocks of said current image or of a reference image for a source block comprising a zone similar to said template, wherein similarity of said similar zone is evaluated according to a criterion of minimization of error between said template and said similar zone; and
    means for building said target set from said source block, delivering predicted pixels;
  means for receiving at least one prediction residue; and
  means for rebuilding a region formed by predicted pixels of said current macroblock, called a predicted region, by adding a prediction residue corresponding to said predicted region, activated once said predicted region complies with a predetermined encoding criterion before all the pixels of said current macroblock have been predicted such that a prediction boundary and an encoding boundary can vary from one another, said predetermined encoding criterion being based on a number of predicted pixels equal to a predetermined threshold, said threshold being strictly lower from a number of pixels comprised in one block of said set of blocks of pixels, and/or on a predetermined configuration in which the predicted pixels form a same row of pixels and/or a same column of pixels of said current macroblock, said criterion for determining priority taking account of a presence of a contour that is a continuation of a contour coming from a set of previously predicted or encoded pixels, where at least one pixel of said set is adjacent to said at least one pixel.

13. A method comprising:

decoding with a decoding device a signal representing at least one image, divided into standard-sized zones macroblocks, one macroblock comprising a set of blocks of pixels, wherein decoding comprises:
  implementing at least two iterations of the following steps, for at least one current macroblock of a current image:
    assigning a priority level of encoding to at least one pixel of said current macroblock, adjacent to at least one previously predicted pixel, according to a predetermined criterion for determining priority;
    selecting a pixel having the highest level of priority, called a priority pixel;
    predicting a set of pixels including the priority pixel, called a target set, implementing the following substeps:
      identifying a template corresponding to a predetermined model region adjacent to said target set, said template and said target set forming a block;
      searching in the previously encoded blocks of said current image or of a reference image for a source block comprising a zone similar to said template, wherein similarity of said similar zone is evaluated according to a criterion of minimization of error between said template and said similar zone; and
      building said target set from said source block, delivering predicted pixels; and
  a step of receiving at least one prediction residue; and
  a step of rebuilding a region formed by predicted pixels of said current macroblock, called a predicted region, by adding a prediction residue corresponding to said predicted region, said rebuilding step being implemented once said predicted region complies with a predetermined encoding criterion before all the pixels of said current macroblock have been predicted such that a prediction boundary and an encoding boundary can vary from one another, said predetermined encoding criterion being based on a predetermined configuration in which the predicted pixels form a same row of pixels and/or a same column of pixels of said current macroblock.

* * * * *